No. 748,459. PATENTED DEC. 29, 1903.
J. C. ANDERSON.
SPECTACLES.
APPLICATION FILED SEPT. 12, 1903.
NO MODEL.
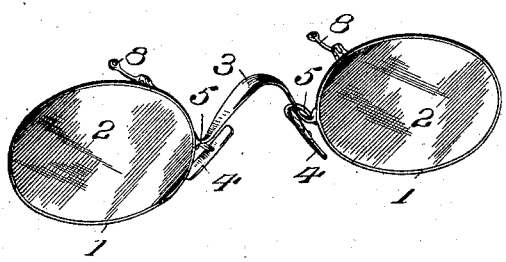
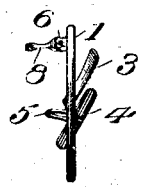
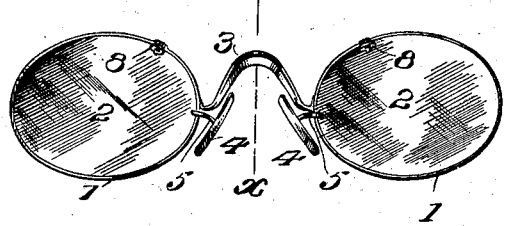
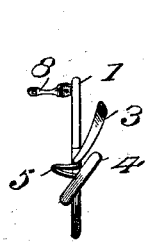
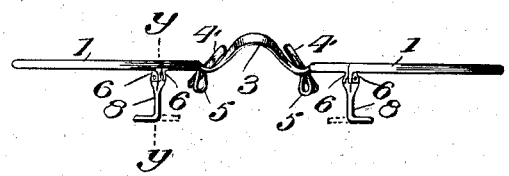
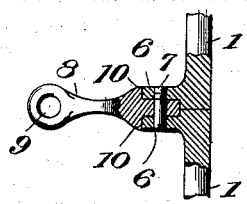
Witnesses:
John W. Wheeler
Inventor
James C. Anderson
By Wm. C. McIntire
Attorney No. 748,459. Patented December 29, 1903.

UNITED STATES PATENT OFFICE.

JAMES C. ANDERSON, OF HIGHLAND PARK, ILLINOIS.

SPECTACLES.

SPECIFICATION forming part of Letters Patent No. 748,459, dated December 29, 1903.

Application filed September 12, 1903. Serial No. 172,892. (No model.)

*To all whom it may concern:*

Be it known that I, JAMES C. ANDERSON, a citizen of the United States, residing at Highland Park, in the county of Lake and State of Illinois, have invented certain new and useful Improvements in Spectacles; and I do hereby declare the following to be a full, clear, and exact description of the invention, such as will enable others skilled in the art to which it appertains to make and use the same.

My invention relates to certain new and useful improvements in spectacles, and particularly to that class shown and described in Letters Patent of the United States granted to me on the 31st day of March, 1903, No. 724,151, in which the lenses are shown as connected by a rigid nose-bridge adapted to be seated upon the nose of the wearer and having forwardly-projecting and downwardly-disposed anchors designed to be seated on each side of the nose and within cavities of the "nasal," whereby the glasses are held in fixed and unvariable relation to the eyes without the employment of any spring or gripping action upon the nose, and provided, further, with means for preventing any accidental upward movement of the glasses which might tend to disturb the proper relation between the glasses and the nose of the wearer.

My present invention, while designed to embody the principles recited in said Letters Patent, is intended to be used in connection with that class of nose-glasses in which the lenses are sustained within metallic rims joined together by the usual nose-bridge.

In all glasses in which the lenses are mounted in metallic sustaining frames or rims such rims are of necessity adapted to expansion to enable the lenses to be adjusted therein and are provided with suitable lugs and an adjusting-screw by means of which the rims may be securely clamped upon or caused to embrace the lenses, and in all such glasses the lugs and securing-screws lie in the same plane with the lenses and of necessity obstruct or interfere to a greater or less extent with the vision of the wearer, causing great annoyance and frequently impairing the eyesight.

My invention has for its object to so construct the rims of glasses that the means employed for securing fixed and proper relation between the lenses and the frames shall be entirely removed from the plane of vision.

My invention has for a further object to utilize the devices employed to clamp the rims upon the lenses as a means for the attachment of the knobs or devices described in my Letters Patent hereinbefore referred to, which prevent any accidental upward movement of the glasses upon the nose of the wearer.

My invention has for a further object to provide for the ready removal and adjustment of the knobs or arms employed in connection with the rims.

With these ends in view my invention consists in the details of construction and arrangement hereinafter more fully described.

In order that those skilled in the art to which my invention appertains may know how to make the same and fully appreciate all of its advantages, I will proceed to decribe the construction of my improved glasses, referring by numerals to the accompanying drawings, in which—

Figure 1 is a perspective view of a pair of nose-glasses embodying the features of my invention. Fig. 2 is an end view of the same. Fig. 3 is a rear elevation. Fig. 4 is a vertical section on the line *x x* of Fig. 3. Fig. 5 is a top or plan view in which is shown a modified construction of the devices employed to guard against the accidental upward movement of the glasses, the dotted lines indicating an adjustment thereof. Fig. 6 is a vertical central section on the line *y y* of Fig. 5 of the clamping devices of the rims or frame and the guard against upward movement, and Fig. 7 is a central horizontal section of the same.

Similar reference-numerals indicate like parts in the several figures of the drawings.

1 1 are the rims, within which the lenses 2 2 are secured. 3 is the nose-bridge connecting the rims 1 1, and 4 4 are the anchors or nose-pads, which are connected through the medium of attenuated ductile arms 5 directly to either the rims 1 1 or the nose-bridge 3, as fully described in the Letters Patent hereinbefore referred to.

The meeting ends of the rims 1 1 are provided with lugs 6 6, which are adapted to be drawn together and secured in fixed relation in the usual manner by a clamping-screw 7, as best shown at Fig. 7, whereby the lenses 2 may be properly and rigidly secured within the rims. These lugs 6, as clearly shown, project rearwardly and in a plane at right angles to the plane of the lenses in contradistinction to being in the same plane therewith, as is the case in the present state of the art. These lugs are preferably so located that when the glasses are in position upon the nose of the wearer said lugs take position within the eye-orbits of the skull and under the brow, so that they are entirely out of all sight-lines, and thus avoid the usual tendency to obscure or interfere with the vision, and they also serve as the means of securing in fixed relation therewith arms 8, which constitute devices to prevent the accidental upward and outward movement of the glasses. These arms 8 may terminate, as shown most clearly at Fig. 7, in a small disk with a central orifice 9 to secure comparative fixed relation with the skin under the brow of the wearer, or the ends may be bent into the form shown at Fig. 5. As shown at Fig. 7, the inner ends of said arms are preferably formed with shoulders 10, adapted to abut against the faces of the lugs 6, so that when they are secured between said lugs by the clamping-screw 7 a firm and immovable relation is established.

The arms 8 are made of ductile material in order that they may be bent and adjusted with reference to the orbit-cavity to perform the function for which they are intended.

The attenuated ductile arms 5 of the anchors or nose-pads 4 may also be bent and adjusted to properly locate the anchors or pads, which, as shown, are so disposed as to take position within the natural cavities or depressions in the nasal structure which occupy a position about parallel with the vertical plane of the nose-bridge 3 and slightly in rear thereof, and when the anchors or pads 4 and the arms 8 are properly adjusted with reference to the nose and eye-orbits of the wearer the ends of the arms 8 will bear such relation to the eye-orbits and the location of the anchors or pads 4 that the latter will be held within the cavities each side of the nose.

When the arms 8 are of the form shown at Fig. 5, they may be so located within the lugs 6 that the free ends may be outwardly disposed, as shown in solid lines, or inwardly, as indicated in dotted lines.

The lugs 6 are so located when they are to be utilized for supporting the arms 8 that the latter shall be in position to be readily adjusted to bear against the orbit-socket reasonably near to the nasal; but it will be understood that I do not wish to be limited in this respect; nor do I wish to be limited to the employment of the arms 8 with the lugs 6, as the latter may be advantageously used with frames irrespective of the means employed to secure the same upon the nose of the wearer, the generic feature of novelty in respect of the means shown for securing the frame or rims upon the lenses residing in the fact that the lugs project at right angles to the plane of the lenses and out of the line of vision. When employed, however, as shown in the drawings and as already explained to constitute means for also securing the arms 8 in position to coöperate with the adjustable nose-pads or anchors 4, it will be readily understood that the glasses as a complete structure may be made exceedingly light and that they may be satisfactorily secured in position upon the nose without producing the disagreeable feeling and hurtful effect which accompanies the employment of a spring nose-bridge or other clamping devices.

The lightness of my improved glasses is due to the fact that when rims are employed to secure the lenses in proper relation with the nose-bridge the lenses may be made exceedingly thin, while with rimless glasses in which the lenses are secured in position by lugs extended from the nose-bridge and clamping-screws passing through said lugs and the lenses the latter must of necessity be made comparatively thick and correspondingly heavy in order that the clamping-screw may be effective.

Another advantage existing in rim-glasses over the ordinary rimless ones resides in the absence of the lugs and screws which of necessity extend within the periphery of the lenses, and consequently within the plane of vision, producing a disagreeable and hurtful effect to the wearer. As the lugs 6 of my improved glasses are arranged at right angles to the plane of the lenses and entirely out of the sight-lines, it will be understood that they may be made comparatively strong in order to give a substantial bearing for the clamping-screw 7, which condition cannot be effected with rims of ordinary construction without increasing the objectionable feature of the obstruction to the sight.

Having described the construction and advantages of my improved glasses, what I claim as new, and desire to secure by Letters Patent, is—

1. As a new article of manufacture, rims for eyeglasses or spectacles provided with lugs at the meeting ends thereof, said lugs extending at right angles to the plane of the rims, and means for connecting the lugs together, substantially as and for the purpose hereinbefore set forth.

2. In rim-glasses, the rims or frame secured upon the lenses by means of lugs at the meeting ends of the rim, said lugs extending at right angles to the plane of the lenses, and secured together by a suitable securing device, substantially as hereinbefore set forth.

3. In glasses such as described, in combination with the rims secured upon the lenses by means of lugs at right angles to the plane of the lenses and a clamping-screw; and a nose-bridge and adjustable anchors or nose-pads connected with the rims, means auxiliary to the anchors or nose-pads for securing the glasses in proper and fixed relation with the eyes of the wearer, said auxiliary devices held in position between the rim-lugs, substantially as hereinbefore set forth.

In testimony whereof I affix my signature in presence of two witnesses.

JAMES C. ANDERSON.

Witnesses:
   D. G. STUART,
   JNO. J. HARROWER.